US010709140B2

(12) United States Patent
Yee et al.

(10) Patent No.: US 10,709,140 B2
(45) Date of Patent: Jul. 14, 2020

(54) METHODS AND PRODUCTS FOR REDUCING THE POPULATION SIZE OF *PAPILIO DEMOLEUS* L. (PAPILIONIDAE)

(71) Applicant: The University of The West Indies, Kingston (JM)

(72) Inventors: Trevor Herbert Yee, Kingston (JM); Charah Tabetha Watson, Kingston (JM); Eric Garraway, Kingston (JM); Dwight Robinson, Kingston (JM); Nemoi Nastassia Sri Garcia Chisholm, St. Catherine (JM)

(73) Assignee: The University of The West Indies, Kingston (JM)

( * ) Notice: Subject to any disclaimer, the term of this patent is extended or adjusted under 35 U.S.C. 154(b) by 120 days.

(21) Appl. No.: 15/913,109

(22) Filed: Mar. 6, 2018

(65) Prior Publication Data
US 2018/0192654 A1    Jul. 12, 2018

Related U.S. Application Data

(62) Division of application No. 13/576,109, filed as application No. PCT/IB2011/000411 on Jan. 28, 2011, now abandoned.

(60) Provisional application No. 61/299,128, filed on Jan. 28, 2010.

(51) Int. Cl.
*A01N 65/36* (2009.01)
*A01N 65/00* (2009.01)
*A01N 65/08* (2009.01)

(52) U.S. Cl.
CPC .......... *A01N 65/36* (2013.01); *A01N 65/00* (2013.01); *A01N 65/08* (2013.01)

(58) Field of Classification Search
CPC ......... A01N 63/00; A01N 65/08; A01N 65/36
See application file for complete search history.

(56) References Cited

U.S. PATENT DOCUMENTS

| 5,510,363 | A | 4/1996 | Thirugnanam |
| 6,074,634 | A | 6/2000 | Lopez, Jr. et al. |
| 2007/0065476 | A1 | 3/2007 | Sexton et al. |
| 2009/0246302 | A1 | 10/2009 | Pathipati et al. |
| 2009/0263511 | A1 | 10/2009 | Shah et al. |
| 2010/0227010 | A1 | 9/2010 | Jones |

FOREIGN PATENT DOCUMENTS

| WO | WO 98/53678 | * 12/1998 |
| WO | WO-2009038599 A1 | 3/2009 |

OTHER PUBLICATIONS

Harvill, Edward K. et al., "Toxicity of Piperine Solutions to Houseflies," Contributions from Boyce Thompson Institute, vol. 13., No Month Listed 1943. Boyce Thompson Institute for Plant Research, Inc., Yonkers 3, New York. pp. 87-92.
International Search Report and Written Opinion for International Application No. PCT/IB11/00411 dated Aug. 31, 2011. 14 pages.
Jacobson, Martin et al., "Pellitorine Isomers. II. The Synthesis of N-Isobutyl-trans-2,trans-4-decadienamide," Contribution from the Bureau of Entomology and Plant Quarantine, Agricultural Research Administration, U.S. Department of Agriculture, vol. 75, Oct. 2, 1952. pp. 2584-2586.
Khan, M. Farhanullah et al., "Comparative Toxicity of Neem Fruit Extract and Cypermethrin Against *Tribolium confusum* Hbst. (Coleoptera: Tenebrionidae) and *Papilio demoleus* Linn. (Lepidoptera: *Papilionidae*)," Philippine Journal of Science, Southernzone Agricultural Research Center, Pakistan Agricultural Research Council, University Campus Karachi-75270, Pakistan, 132 (2) Dec. 2003. pp. 109-114.
Nair, Muraleedharan G. et al., "Insecticidal Properties of Some Metabolites of Jamaican *Piper* spp., and the Amides Synthesized from 5,6-Z and E-Butenolides," Agric. Biol. Chem., Departments of Chemistry and Zoology, University of the West Indies, Mona, Kingston, Jamaica, 50 (12), Jun. 9, 1986. pp. 3053-3058.
No Author Listed, International Centre of Insect Physiology and Ecology Twelfth Annual Report. No Month Listed 1984. 102 pages.
Parmar, Virinder S. et al., "Phytochemistry of the Genus *Piper*," Pytochemistry. Department of Chemistry, University of Delhi, Delhi-110-007, India, Odense University, DK-5230 Odense M, Denmark, Chemistry Department, Royal Veterinary and Agricultural University, DK-1871 Frederiksberg C, Copenhagen Denmark, Elsevier Science Ltd., vol. 46, No. 4, No Month Listed 1997. pp. 597-673.
Prudic, K. Oliver et al., "The Signal Environment is More Important than Diet or Chemical Specialization in the Evolution of Warning Coloration", PNAS, Dec. 4, 2007, vol. 104, No. 49, pp. 19381-19386.
Saxena, K.N. et al., "Host-Plant Relations of the Citrus Butterfly *Papilio demoleus* L.: Orientational and Ovipositional Responses," Ent. exp. & appl. Zoology Department, Delhi University, Dehli-110007, India 24, No Month Listed 1978. Received for Publication Jul. 20, 1977. pp. 1-10.
Silva, Wilson Castro et al., Toxicity of *Piper aduncum* L. (Piperales: Piperaceae) from the Amazon Forest for the Cattle Tick *Rhipicephalus* (*Boophilus*) *microplus* (Acari: Ixodidae). Veterinary Parasitology 164, Jun. 8, 2009. pp. 267-274.
Su, Helen C.F., "Insecticidal Properties of Black Pepper to Rice Weevils and Cowpea Weevils," Stored-Product Insects Research and Development Laboratory, Agric. Res. Serv. USDA, Savannah, GA 31403. Feb. 1997. pp. 18-21.

(Continued)

*Primary Examiner* — Johann R Richter
*Assistant Examiner* — Danielle Sullivan
(74) *Attorney, Agent, or Firm* — Wilmer Cutler Pickering Hale and Dorr LLP

(57) ABSTRACT

The methods, kits, and products for controlling a target insect population are disclosed in which a non-host plant containing a toxin and a chemical attractant known to attract the target insect is treated with chemical attractant from a plant of interest. The chemical attractant induces the target insect to lay eggs on the non-host plant. The resulting offspring die of starvation from refusing to feed on the non-host plant. The non-host plant and plant of interest contain at least one common chemical. The methods, kits, and products for controlling a target insect population using an extract from a non-host plant are also disclosed. The non-host plant extract is applied to the plant of interest, and when ingested or applied directly to the target insect, kills the target insect or causes it to develop with deformities.

31 Claims, 5 Drawing Sheets

(56) References Cited

OTHER PUBLICATIONS

Vickerman, Daniel B. et al., "Maintenance of Narrow Diet Breadth in the Monarch Butterfly Caterpillar: Response to Various Plant Species and Chemicals," Entomologia Experimentalis et Applicata, 104, Aug. 5, 2002. pp. 255-269. Department of Ecology & Evolutionary Biology, University of Kansas, Lawrence, KS 66045.

Miyakado et al., "Structure, Chemistry and Actions of the Piperaceae Amides: New Insecticidal Constituents Isolated from the Pepper Plant," Chapter 22 of Natural Products for Innovative Pest Management, The international Centre of Insect Physiology & Ecology, Nairobi, Kenya, Pergamon Press, edited by David L Whitehead et al., Aug. 1983, pp. 369-382.

\* cited by examiner

METHODS AND PRODUCTS FOR REDUCING THE POPULATION SIZE OF *PAPILIO DEMOLEUS* L. (PAPILIONIDAE)

CROSS REFERENCE TO RELATED APPLICATIONS

This application is a divisional application of U.S. National Phase application Ser. No. 13/576,109 filed Jul. 30, 2012, which is a U.S. National Phase application of International Patent Application No. PCT/IB11/00411, filed Jan. 28, 2011 and published as WO 2011/092600 on Aug. 4, 2011, which claims the benefit and priority of U.S. Provisional Application Ser. No. 61/299,128, filed Jan. 28, 2010, the contents of which are incorporated herein by reference in their entirety.

BACKGROUND

The lemon, lime, citrus, or checkered swallowtail butterfly, *Papilio demoleus* (Lepidoptera: Papilionidae) ("*P. demoleus*"), a butterfly that originates in the Middle to Far East, is a destructive pest of citrus. It is endemic to southern Asia, from Iran and the Middle East to India, and to the Pacific, from New Guinea to Australia. *P. demoleus* was first documented in the Western hemisphere in the Dominican Republic in 2004. By 2006, it was also documented in Puerto Rico and Jamaica.

*P. demoleus* is a very successful invasive species. Since the 1970s, *P. demoleus* has invaded the islands of Java, Borneo, Philippines, and Sumatra. Deforestation and the increased availability of citrus groves have facilitated the spread of the species. *P. demoleus* has the destructive ability to defoliate vast amounts of young citrus trees in outbreaks severe enough to skeletonize entire groves and nurseries. Young seedlings are particularly vulnerable, as they are less able to survive having their leaves eaten by butterfly larvae compared to mature citrus plants, so the feeding on young citrus plants has a particularly devastating effect. Their consumption of citrus is costly and wasteful, and makes citrus-feeding butterflies a tremendous pest of the citrus industry.

The danger of this destructive species migrating to the United States cannot be ignored. Citrus crops grown in Florida, California, Arizona, and Texas comprise a multi-billion dollar industry. If *P. demoleus* were to migrate to these parts of the United States, the economic effect would be devastating.

Measures taken by the industry to prevent or minimize attacks on citrus plants have thus far proved expensive, and in some instances, deleterious to the environment. These methods include the use of insecticides, fungi, parasites, hand removal, and the use of physical barriers such as netting.

The genus *Piper* is known to contain plants with many pesticidal, repellant, and fungicidal properties, many of which are attributed to high concentrations of phenylpropanoid, dillapiol, piperonyl butoxide, and safrole and their analogs. For example, *Piper nigrinodum*, or black pepper, which is known to cause high mortality against flour and cowpea beetles and houseflies, contains toxins such as piperine, pellitorine, and pipercide. Helen C. F. Su, *J. Econ. Ent.*, 70:18-21 (1977); E. K. Harvill, A. Hartzell, and J. M. Arthur, *Contrib. Boyce Thompson Inst.*, 13:87-92 (1943); Martin Jacobson, *J. Am. Chem. Soc.*, 75: 2584-2586 (1953); and D. L. Whitehead and W. S. Bowers Eds., *Natural Products for Innovative Pest Management*, vol. 2, Pergamon Press, New York, pp. 369-382 (1983). Additionally, *Piper aduncum* oils have been known to have pesticidal qualities against cattle ticks, flour beetles, the housefly, and the American cockroach. See, e.g., Kong Chiou et al., *J. Trop. Med. Parisitol.*, 32: 52-57 (2009) I Ling A, et al., *Iranian J. Arthropod-Borne Dis.*, 3:1-6 (2009); Muraleedharan G. Nair, et al., *Agric. Biol. Chem.* 50:3053-3058 (1986); and Wilson, Castro Silva, et al., *Veterinary Parasitology*, 164: 267-274 (2009).

SUMMARY

Methods, kits, and products related to controlling the size of a target insect population, butterflies in particular, are disclosed herein. In one embodiment, the method of controlling the population size of a target insect comprises placing a non-host plant, which is characterized as a plant containing a chemical attractant that is known to attract target insects and a toxin that is known to be toxic to target insects, near a plant of interest. The plant of interest can sustain target insects and generally contains an attractant for target insects. The plant of interest is not treated with a chemical attractant. Target insects are naturally attracted to feeding and breeding on plants of interest in the wild. The non-host plant is considered near the plant of interest if the distance between them is less than or equal to the target insects' foraging range.

Protecting plants of interest from the feeding of target insects is desirable, and it is achieved by applying a chemical attractant, generally in greater amounts than are naturally present in the non-host plant, to the non-host plant. The chemical attractant induces target insects to lay eggs on the non-host plants instead of plants of interest. However, because there are toxins or deterrent chemicals present in the non-host plant that strongly discourage or prevent feeding by the emerging juveniles, the emerging juveniles will not feed on the non-host plant on which they were laid, and ultimately die from starvation.

In another embodiment, target insect populations are controlled by applying an extract from non-host plants to plants of interest. The non-host plant extract causes deformity or death when target insects ingest or are exposed to it. Therefore, when gravid female target insects, attracted to the chemical attractant found in the plant of interest, lay eggs on the plant of interest, the hatched larvae feed on the plant of interest and ingest the toxic non-host plant extract. The majority of the larvae become deformed or die. Alternatively, non-host plant extract can be applied directly to target insects, which also results in death or deformity.

In one aspect, a pest control agent that includes a chemical attractant selected from a group consisting of oil derived from a citrus plant, limonene, d-limonene, or a combination thereof, with an agriculturally acceptable carrier, is used to control the feeding and breeding behavior of target insects.

In another aspect, a pest control agent that includes an extract derived from a non-host plant, an agriculturally acceptable carrier, and in some embodiments, limonene, or d-limonene is used to control target insect populations by causing death or deformity in target insects that ingest or otherwise come into contact with it.

In one aspect, a pest control agent for reducing the number of citrus-feeding butterflies is disclosed. The agent comprises a toxic extract and an agriculturally acceptable carrier for application to butterflies. The toxic extract can be derived from a *Piper* plant.

In another aspect, a kit for repelling the feeding of target insect larvae is disclosed. The kit provides a chemical attractant derived from a plant of interest. It also includes instructions for applying the chemical attractant to a non-host plant. Using this kit, gravid female target insets are induced to lay eggs on the non-host plant, but the target insect larvae that hatch refuse to feed on the non-host plant, and therefore die from starvation.

In still another embodiment, a kit for attracting the feeding of target insect larvae on a harmful extract is disclosed. The kit includes the extract of a non-host plant that causes deformity or death when ingested by target insect larvae, or when applied directly to target insects at any stage of development. The kit also includes instructions for applying the extract to a plant of interest. Using this kit, gravid female target insects lay eggs on the plant of interest treated with non-host plant extract. The larvae that hatch feed on the treated plant of interest and become deformed or die.

In any one of the above embodiments, the target insect is a citrus-feeding insect. In one embodiment, the target insect is a citrus-feeding butterfly.

In another embodiment, the target insect belongs to the species *Papilio demoleus*. In any one of the above embodiments, the target insect is *Papilio demoleus: demoleus* L.; *Papilio demoleus: libanius* Fruhstorfer; *Papilio demoleus: malayanus* Wallace; *Papilio demoleus: novoguineensis* Rothschild; *Papilio demoleus: sthenelus* Macleay; or *Papilio demoleus: stenelius* Rothschild.

In any one of the above embodiments, the non-host plant is incapable of sustaining the target insect. In another embodiment, the non-host plant is a *Piper* plant. The non-host plant may also be a plant on which the target insect does not naturally feed in the wild. In any one of the above embodiments, the non-host plant can be one or more plants selected from the group consisting of *Piper amalago* var. *amalago* L. (Piperaceae), *Piper aduncum, Piper nigrinodum, Cleome rutidosperma* (Capperaceae), *Pentas* spp. (Rubiaceae), *Lantana camara* (Verbenaceae), *Canna indica* ((Cannaceae), *Kalanchoe crassula* (Crassulaceae), *Pimenta dioica* (Myrtaceae), *Peperomia pellucida* (Piperaceae), *Phyllanthus amarus* (Euphorbiaceae), *Pilea microphylla: microphylla* (Urticaceae), *Oxalis corymbosa* (Oxalidaceae), *Begonia* sp. (Begoniaceae), and *Dracaena sandariana* (Liliaceae) (Chinese bamboo).

In one or more aspects, the extract comprises an oil derived from the non-host plant selected from the group consisting of *Piper amalago* var. *amalago* L. (Piperaceae), *Piper aduncum, Piper nigrinodum, Cleome rutidosperma* (Capperaceae), *Pentas* spp. (Rubiaceae), *Lantana camara* (Verbenaceae), *Canna indica* ((Cannaceae), *Kalanchoe crassula* (Crassulaceae), *Pimenta dioica* (Myrtaceae), *Peperomia pellucida* (Piperaceae), *Phyllanthus amarus* (Euphorbiaceae), *Pilea microphylla:microphylla* (Urticaceae), *Oxalis corymbosa* (Oxalidaceae), *Begonia* sp. (Begoniaceae), and *Dracaena sandariana* (Liliaceae) (Chinese bamboo).

In one or more embodiments, the non-host plant is a *Piper* plant. The non-host plant may also be *Piper aduncum*. In one or more embodiments, the non-host plant contains apiol.

In any one of the above embodiments, the plant of interest is a citrus plant.

In any one of the above embodiments, the plant of interest is selected from the group consisting of the plant of interest can be selected from the group consisting of *Citrus aurantifolia* (Christm.) Swingle (Rutaceae), lime, *C. limon* (L.) Burm. F., lemon, *C. sinensis* (L.) Osbeck, sweet orange, *C. reticulata* Blanco, Mandarin orange, tangerine, *C. paradisi* Macf, grapefruit, *C. medica* L., citron, *C. aurantium* L. Seville orange, *C. grandis* (L.) Osbeck, shaddock, pummelo, *C. maxima* (Burm.) Merr, ugli, *C. reticulata* Blanco×*C. sinensis* (L.) Osbeck, ortanique, *C. mitis* Blanco, calamondin, *Fortunella margarita* Lour. Swingle, kumquat (Rutaceae), *Amyris* P. Browne Rutaceae), *Zanthoxylum* L., *Zanthoxylum martinicense* (Lam.), *Z. pterota* L. (Rutaceae), *Cleome rutidosperma* (Capparaceae), *Pimenta dioica* (Myrtaceae).

In one or more aspects, the chemical attractant comprises oil derived from a plant on which the target insect does not naturally feed in the wild. In one or more aspects, the chemical attractant comprises oil derived from the plant of interest selected from the group consisting of *Citrus aurantifolia* (Christm.) Swingle (Rutaceae), lime, *C. limon* (L.) Burm. F., lemon, *C. sinensis* (L.) Osbeck, sweet orange, *C. reticulata* Blanco, Mandarin orange, tangerine, *C. paradisi* Macf., grapefruit, *C. medica* L., citron, *C. aurantium* L. Seville orange, *C. grandis* (L.) Osbeck, shaddock, pummelo, *C. maxima* (Burm.) Merr, ugli, *C. reticulata* Blanco×*C. sinensis* (L.) Osbeck, ortanique, *C. mitis* Blanco, calamondin, *Fortunella margarita* Lour. Swingle, kumquat (Rutaceae), *Amyris* P. Browne Rutaceae), *Zanthoxylum* L., *Zanthoxylum martinicense* (Lam.), and *Z. pterota* L. (Rutaceae).

In any of the above embodiments, the chemical attractant comprises limonene, or d-limonene.

In any of the above embodiments, the extract comprises a toxin such as apiol, piperine, pellitorine, pipercide, phenylpropanoid, dillapiol, safrole, piperonyl butoxide, or their analogs. The extract can also comprise an attractant such as limonene or d-limonene.

In one aspect, the chemical attractant or extract is applied to the plant of interest in the form of a spray, paste, gum, oil, solution, aerosol, mist, dust, fume, or gas.

In another aspect, target insect populations are controlled by applying an extract derived from a non-host plant directly to the target insects as a pesticide to kill or deform target insects.

In one or more embodiments, the aerosol consists of a mixture of limonene, d-limonene, or a mixture thereof, and butane and propane.

In one or more embodiments, the spray is an emulsion that consists of chemical attractant or extract, and water or a suitable alcohol such as ethanol.

In one or more embodiments, the amount of chemical attractant or extract in the mixture is about 0.01%-0.05%; 0.05%-0.10%, 0.10%-0.15%, 0.15%-0.20%; 0.20%-0.25%; 0.25%-0.30%; 0.30%-0.35%; or 0.35%-0.40%; 0.40%-0.45%; or 0.45%-0.50% by weight.

In one or more embodiments, the extract in the mixture is 0.1%-0.5%; 0.5%-1.0%, 1.0-1.5%, 1.5%-2.0%, 2.0%-2.5%, 2.5%-3.0%, 3.0%-3.5%, 3.5%-4.0%, 4.0%-4.5%, 4.5%-5.0%, 5.0%-5.5%, 5.5%-6.0%, 6.0%-6.5%, or 6.5%-7.0% by weight.

In one or more aspects, the instructions direct the application of the chemical attractant to the non-host plant or the extract to the plant of interest at least once daily, twice daily, weekly, twice weekly, or at least once monthly.

In one or more aspects, the application of chemical attractant to the non-host plant induces a gravid female target insect to lay eggs on the non-host plant, but repels the feeding of emerging juvenile target insects, causing them to die of starvation.

In one or more aspects, the application of the extract to the plant of interest causes death or deformity in target insects that ingest or are otherwise exposed to

BRIEF DESCRIPTION OF THE DRAWINGS

It is to be understood that while the embodiments have been described in conjunction with the detailed description thereof, the foregoing description is intended to illustrate and not limit the scope of the embodiments, which is defined by the scope of the appended claims. Other aspects, advantages, and modifications are within the scope of the following claims.

DEFINITIONS

Figure 1:
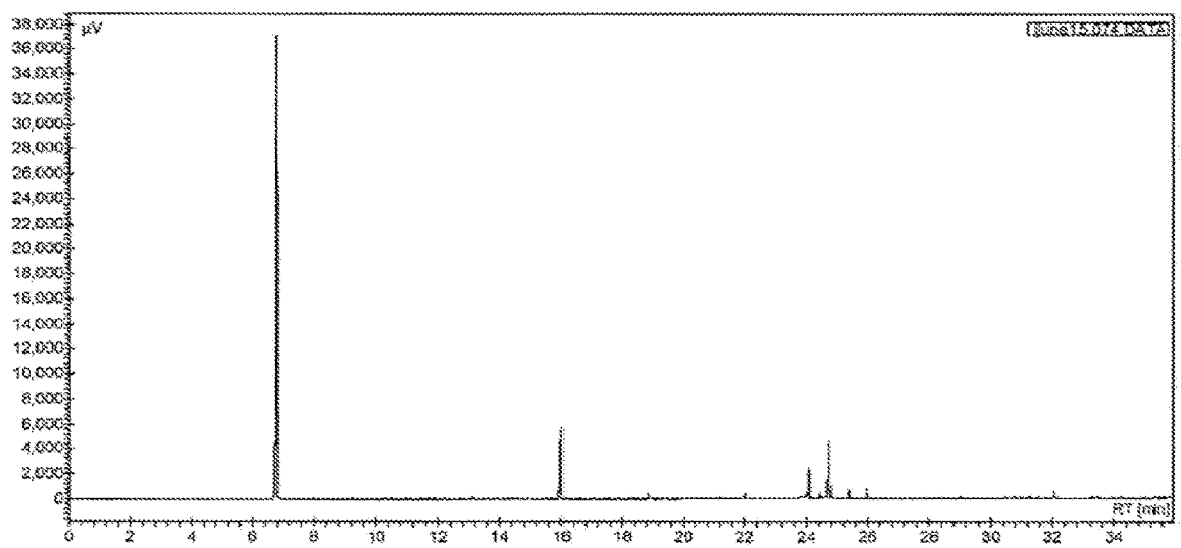
FIG. 1 is an image of a gas chromatograph of lime plant leaf essential oils.

For convenience, certain terms employed in the specification, examples, and appended claims are collected here. Unless defined otherwise, all technical and scientific terms used herein have the same meaning as commonly understood by one of ordinary skill in the art to which this invention belongs. The initial definition provided for a group or term herein applies to that group or term throughout the present specification individually or as part of another group, unless otherwise indicated.

The articles "a" and "an" are used herein to refer to one or to more than one (i.e., to at least one) of the grammatical object of the article. By way of example, "an element" means one element or more than one element.

The term "or" was used herein to mean, and was used interchangeably with, the term "and/or," unless context clearly indicates otherwise.

"Agriculturally acceptable carrier," as that term is used herein, is a medium that is suitable for delivery of the population control composition. The medium generally is compatible with active ingredients and excipients of the population control composition and has a benign effect on the environment. The excipient may be a wetting agent, spreading agent, deposit builder, adhesive, emulsifying agent, deflocculating agent, water modifier, or similar agent with or without toxic properties of its own. The excipient is intended to be used with the active ingredient as an aid to its application or to its effect.

"Non-host plant," as that term is used herein, is a plant that is not naturally attractive to the target insect, but that can be made attractive by application of certain chemical attractants. The non-host plant is poisonous to the target insect, and therefore is not a source of food for the target insect. The non-host plant and plant of interest may or may not share a common chemical that acts as an attractant to the target insect.

"Non-host plant extract," as that term is used herein, means the oils, such as the essential oils, obtained from a non-host plant. The extract can be obtained by chemical, physical, or mechanical means. It is capable of causing death or deformity in a target insect if ingested.

"Chemical attractant," as that term is used herein, means the oils, such as the essential oils, obtained from a plant of interest by chemical, physical, or mechanical means. The chemical attractant is known to be attractive to the target insect. It affects the feeding and breeding behavior of target insects.

"Pest control agent," as that term is used herein, means an ingredient or a composition containing an ingredient that controls the population of a target insect. Population control can be accomplished in a variety of ways, including interruption with the feeding and/or breeding cycle of the target insect. The pest control agent can also serve as an attractant (for example, attracting the target insect away from the plant of interest or inducing female target insects to lay eggs on or consume plants treated with the attractant) or a deterrent (for example, repelling the target of interest from the plant of interest).

"Plant of interest," as that term is used herein, is a plant that is a host plant for the target insect; it is naturally attractive to target insects. In some instances, the plant of interest is selected by the target insect for egg laying and the plant of interest serves as a source of food for the emerging larvae. The plant of interest typically possesses commercial or aesthetic properties that impart value to the plant. The plant of interest is one sought to be protected, but is also a plant that target insects are naturally attracted to feeding or breeding on in the wild.

"Target Insect," as that term is used herein, is an insect that is naturally attracted to the plant of interest and for which it is desired to implement a measure of population control. Typically, the desire for population control arises from the damage inflicted on the plant of interest by the target insect. The term 'target insect' encompasses the insect at all stages of development and its offspring, including the mature insect, eggs, pupae stage, and larvae.

DETAILED DESCRIPTION

All publications, patent applications, patents, and other references mentioned herein are incorporated by reference in their entirety. In addition, the materials, methods, and examples are illustrative only and not intended to be limiting. Unless otherwise defined, all technical and scientific terms used herein have the same meaning as commonly understood by one of ordinary skill in the art to which these methods and products belong. Although methods and materials similar or equivalent to those described herein can be used in the practice or testing of the present methods and products, suitable methods and materials are described below.

The methods, kits, and pest control agents described herein relate to chemicals, plant extracts, chemical compositions and their use to control the population size of target insects, such as butterflies. Using plant-derived chemical attractants or non-host plant extracts to control target insect feeding and egg laying is advantageous because it is a natural and effective method for reducing the number of target insects that feed on valuable or aesthetic crops. With fewer target insects about, valuable and aesthetic crops are allowed to thrive and are not consumed by target insects.

The methods, kits, and pest control agents can include chemical attractants that attract the target insect to a non-host plant or extracts that are toxic to the target insect as a way to reduced the population size of target insects. The target insect typically is a pest that is harmful or destructive to a plant of interest.

In one aspect, a non-host plant is provided as a place on which to induce gravid female target insects to lay their eggs. The non-host plant is treated with chemical attractants that induce gravid females to lay eggs on its leaves. However, the non-host plant contains a chemical or chemicals that are repellent or act as toxins to target insects, and is therefore not a suitable food source or breeding site for target insects. Therefore, emerging juveniles laid on non-host plants refuse to feed on non-host plant leaves, and unable to move to another food source, die from starvation. The non-host plant and plant of interest may or may not share a common chemical that acts as an attractant to the target insect.

The non-host plant serves as an alternative breeding site for the target insect, so that the extent of egg laying on the plant of interest is reduced. The non-host plant is located a selected distance from a plant of interest desired to be protected from feeding target insects. The distance between the non-host plant and plant of interest is small enough to allow the non-host plant to be an alternative breeding site for target insects, but great enough to span the target insects' foraging and migration ranges. The actual distance depends on the individual foraging patterns of particular target insect species, migration patterns of a particular target insect species, ambient conditions, and the method of application used to apply the chemicals to the leaves. The non-host plants can be, e.g., a distance of about 10 meters to about 10 or more kilometers, from the plants to be protected. When the target insect is a butterfly, and in particular a butterfly of the species *P. demoleus*, the distance between the non-host plant and plant of interest may be up to one to two kilometers. In some instances, the non-host plant may be naturally occurring in the environment of the plant of interest. In some instances, the non-host plant can be introduced into the environment deliberately or accidentally.

Treatment is considered effective when, e.g., a significant percentage of emerging juveniles refuse to feed on non-host plants treated with chemical attractant. In one or more embodiments, more than 25% of the emerging juveniles refuse to feed on the non-host plant. In one or more embodiments, more than 50% of the emerging juveniles refuse to feed on the non-host plants. In one or more embodiments, more than 55%, more than 60%, more than 65%, more than 70%, more than 75%, more than 80%, more than 85%, more than 90%, or more than 95% of the emerging juveniles refuse to feed on non-host plants with chemical attractant applied to their leaves.

In one or more embodiments, the chemical attractant is an extract from the plant of interest, which is known to be an attractant for the target insect. In other embodiments, the chemical attractant is a concentrated or purified component of the plant extract that is enriched in the chemical attractant. When the chemical attractant is applied to the non-host plant in amounts greater than naturally occurring levels found in nearby plants of interest, the majority of gravid females prefer to lay eggs on non-host plants treated with the chemical attractant to nearby untreated plants of interest. For some target insects known to prefer to lay and breed on citrus plants, the chemical attractant contains limonene or d-limonene.

In any one of the above described embodiments, the target insects can be a species of butterfly. For example, the target insects can be gravid female butterflies. In some embodiments, the butterfly is selected from those that rely on plants of the citrus family as a host plant or plant of interest. Exemplary target insects include one or more of *Papilio demoleus: demoleus* L.; *Papilio demoleus: libanius* Fruhstorfer; *Papilio demoleus: malayanus* Wallace; *Papilio demoleus: novoguineensis* Rothschild; *Papilio demoleus: sthenelus* Macleay; and *Papilio demoleus: stenelius* Rothschild. A particular target insect is *P. demoleus: demoleus*.

The plant of interest can be selected from the group consisting of *Citrus aurantifolia* (Christm.) Swingle (Rutaceae), lime, *C. limon* (L.) Burm. F., lemon, *C. sinensis* (L.) Osbeck, sweet orange, *C. reticulata* Blanco, Mandarin orange, tangerine, *C. paradisi* Macf, grapefruit, *C. medica* L., citron, *C. aurantium* L. Seville orange, *C. grandis* (L.) Osbeck, shaddock, pummelo, *C. maxima* (Burm.) Merr, ugli, *C. reticulata* Blanco×*C. sinensis* (L.) Osbeck, ortanique, *C. mitis* Blanco, calamondin, *Fortunella margarita* Lour. Swingle, kumquat (Rutaceae), *Amyris* P. Browne Rutaceae), *Zanthoxylum* L., *Zanthoxylum martinicense* (Lam.), *Z. pterota* L. (Rutaceae), *Cleome rutidosperma* (Capparaceae), and *Pimenta dioica* (Myrtaceae).

In any one of the above embodiments, the non-host plant is selected from the group consisting of *Piper* spp., including, but not limited to *Piper amalago* var. *amalago* L. (Piperaceae), *Piper aduncum*, and *Piper nigrinodum*, *Cleome rutidosperma* (Capperaceae), *Pentas* spp. (Rubiaceae), *Lantana camara* (Verbenaceae), *Canna indica* ((Cannaceae), *Kalanchoe crassula* (Crassulaceae), *Pimenta dioica* (Myrtaceae), *Peperomia pellucida* (Piperaceae), *Phyllanthus amarus* (Euphorbiaceae), *Pilea microphylla:microphylla* (Urticaceae), *Oxalis corymbosa* (Oxalidaceae), *Begonia* sp. (Begoniaceae), and *Dracaena sandariana* (Liliaceae) (Chinese bamboo).

The population size of target insects can be controlled by applying the extract of a non-host plant to plants of interest. Plants of interest naturally contain chemical attractant that induce target insects to breed on the plants of interest. However, extracts derived from non-host plants, which may or may not also contain a chemical attractant or attractants, are poisonous to target insects. Therefore, when extracts derived from non-host plants are applied to the leaves of plants of interest, gravid female target insects are attracted to the chemical attractant or attractants in the plant of interest and lay their eggs on it. When the larvae emerge, they consume the leaves and ingest the non-host plant extract used to treat the plant. As a result, the majority of the offspring either die in early stages of the life cycle, or become deformed adults that are unable to fly and thus unable to reproduce and function normally. This method thereby reduces the population size of, and protects plants of interest from being destroyed by feeding target insects.

In another aspect, extract derived from a non-host plant is applied directly to target insects at any stage of development. Because non-host plants contain toxic compounds that are poisonous to target insects, application of such an extract directly to target insects causes death and deformities in target insects that come into contact with or ingest non-host plant extract.

Treatment is considered effective when, e.g., a majority of target insects, e.g., emerging juveniles, either dies or develop with deformities. In one or more embodiments, more than 50% of the emerging juveniles dies or grows deformed from ingesting extract. In one or more embodiments, more than 55%, more than 60%, more than 65%, more than 70%, more than 75%, more than 80%, more than 85%, more than 90%, or more than 95% of the emerging juveniles dies or grows deformed from ingesting extract.

A kit useful for reducing the number of target insects in a given area can include a pest control agent consisting of either a chemical attractant derived from a plant of interest, or an extract derived from a non-host plant. The chemical attractant or non-host plant extract can also include an agriculturally acceptable carrier for carrying, suspending, or dissolving the active agents. The agents can be in, e.g., the form of an aerosol mixture that is applied by spraying onto to the plant of interest or the non-host plant. The kit can also include excipients suitable for pest control compositions that are well known in the art. The excipient may be a wetting agent, spreading agent, deposit builder, adhesive, emulsifying agent, deflocculating agent, water modifier, or similar excipient with or without toxic properties of its own intended to be used with pesticides as an aid to its application or to its effect. By way of example, the agriculturally acceptable carrier may include surfactants to aid in the suspension of the pest control agent and/or spray formation. The kit also can include instructions for applying the chemical attractant to the non-host plant or the non-host plant extract to the plant of interest.

Also disclosed are pest control compositions. In one aspect, the pest control composition comprises a chemical attractant. In another embodiment, the pest control composition comprises an extract derived from a non-host plant. The pest control agents further comprise an agriculturally suitable carrier. The agents can be in, e.g., the form of an aerosol mixture that is applied by spraying onto to the plant of interest or the non-host plant.

The population size of *P. demoleus* can be reduced by attracting egg laying, e.g., by applying a chemical attractant to the leaves of non-host plants selected from the group consisting of *Piper amalago* var. *amalago* L. (Piperaceae), *Piper aduncum, Piper nigrinodum, Cleome rutidosperma* (Capperaceae), *Pentas* spp. (Rubiaceae), *Lantana camara* (Verbenaceae), *Canna indica* ((Cannaceae), *Kalanchoe crassula* (Crassulaceae), *Pimenta dioica* (Myrtaceae), *Peperomia pellucida* (Piperaceae), *Phyllanthus amarus* (Euphorbiaceae), *Pilea microphylla:microphylla* (Urticaceae), *Oxalis corymbosa* (Oxalidaceae), *Begonia* sp. (Begoniaceae), and *Dracaena sandariana* (Liliaceae) (Chinese bamboo).

In particular embodiments, the non-host plant is *Piper amalago* var. *amalago* plant. For *P. demoleus*, the plant of interest can belong to one of a variety of plant species. The plant of interest is one or more of citrus plants including *Citrus aurantifolia* (Christm.) Swingle (Rutaceae), lime, *C. limon* (L.) Burm. F., lemon, *C. sinensis* (L.) Osbeck, sweet orange, *C. reticulata* Blanco, Mandarin orange, tangerine, *C. paradisi* Macf., grapefruit, *C. medica* L., citron, *C. aurantium* L. Seville orange, *C. grandis* (L.) Osbeck, shaddock, pummelo, *C. maxima* (Burm.) Merr, ugli, *C. reticulata* Blanco×*C. sinensis* (L.) Osbeck, ortanique, *C. mitis* Blanco, calamondin, *Fortunella margarita* Lour. Swingle or kumquat (Rutaceae).

For example, the plant of interest can be lime plant, which is a plant to which *P. demoleus* is naturally attracted, is capable of sustaining *P. demoleus*, and contains the attractant d-limonene (see Table 1A). The composition of an extract of essential oils from the lime plant shows that it contains high levels (ca. 22 wow %) of d-limonene. Similarly, plant of interest can also be, e.g., sweet orange (see, Table 1B) or *Z. martinicense* (see, Table 1C), which also contain the attractant d-limonene.

TABLE 1A

Composition of Lime Plant Essential Oils Obtained by Gas Chromatography

| $T_{RV}$/min | Compound | % Area | $RI^b$ | $ID^c$ |
|---|---|---|---|---|
| 4.47 | 4 hydroxy-4-methyl-2-pentanone | 10.13 | 994 | GCMS, RI |
| 6.92 | decane | 1.9 | 614 | GCMS, RI |
| 7.59 | d-limonene | 22.04 | 1074 | GCMS, RI |
| 8.57 | undecane | 3.49 | 1132 | GCMS, RI |
| 9.54 | citronellal | 1.22 | 1195 | GCMS, RI |
| 9.93 | thujone | 1.92 | 1228 | GCMS, RI |

TABLE 1A-continued

Composition of Lime Plant Essential Oils Obtained by Gas Chromatography

| $T_{RV}$/min | Compound | % Area | $RI^b$ | $ID^c$ |
|---|---|---|---|---|
| 10.14 | dodecane | 0.54 | 1247 | GCMS, RI |
| 10.62 | nerol | 8.62 | 1291 | GCMS, RI |
| 10.93 | geraniol | 1.22 | 1323 | GCMS, RI |
| 11 | neral | 9.13 | 1331 | GCMS, RI |
| 11.40 | geranial | 12.91 | 1377 | GCMS, RI |
| 12.18 | geranyl acetate, (Z) | 2.9 | 1478 | GCMS, RI |
| 12.77 | geranyl acetate (E) | 2.74 | 1565 | GCMS, RI |
| 17.73 | squalene | 18.53 | 2184 | GCMS, RI |
| | Total | 97.28 | | |

$^a$Elution order on HP capillary column.
$^b$Retention index relative to n-alkane series ($C_5$-$C_{30}$ excluding $C_{27}$ and $C_{29}$) on HP DB-5 column,
$^c$GCMS identification by Gas-chromatography-Mass spectroscopy

TABLE 1B

Composition of *Citrus sinensis* (Sweet orange) Essential Oils Obtained by Gas Chromatography

| $T_R$/min | Compound$^a$ | % Area | $RI^b$ | $ID^c$ |
|---|---|---|---|---|
| 4.77 | 3-hydroxy-2-pentanone | 12.62 | 676 | GCMS, RI |
| 7.00 | sabinene | 5.10 | 1038 | GCMS, RI |
| 7.92 | p-cymene | 4.41 | 1091.76 | GCMS, RI |
| 8.02 | d-limonene | 21.75 | 1097 | GCMS, RI |
| 8.62 | linalool | 6.50 | 1161.54 | GCMS, RI |
| 9.02 | cis-linalool oxide | 7.63 | 1173.08 | GCMS, RI |
| 9.54 | citronellal | 1.88 | 1194.87 | GCMS, RI |
| 10.03 | terpinene-4-ol | 5.12 | 1237.27 | GCMS, RI |
| 10.52 | camphene | 3.01 | 1281.82 | GCMS, RI |
| 11.06 | 2-methyl-5-(1-methylethyl)-2-cyclohexen-1-ol | 1.58 | 1338.64 | GCMS, RI |
| 11.08 | citral | 2.20 | 1340.91 | GCMS, RI |
| 11.14 | 2-methyl-5-(1-methylethyl)-2-cyclohexen-1-one | 2.14 | 1347.73 | GCMS, RI |
| 11.4 | geranial | 2.2 | 1377.27 | GCMS, RI |
| 11.66 | 4-(1-methylethyl)Benzene-methanol | 1.68 | 1402.90 | GCMS, RI |
| 12.52 | nerol | 1.16 | 1444.44 | GCMS, RI |
| 13.18 | methyl eugenol | 14.09 | 1476.33 | GCMS, RI |
| | Total | 93.07 | | |

$^a$Elution order on HP capillary column.
$^b$Retention index relative to n-alkane series ($C_5$-$C_{30}$ excluding $C_{27}$ and $C_{29}$) on HP DB-5 column,
$^c$GCMS identification by Gas-chromatography-Mass spectroscopy

TABLE 1C

Composition of *Z. martinicense* Essential Oils Obtained by Gas Chromatography

| $T_R$/min | Compound$^a$ | % Area | $RI^b$ | $ID^c$ |
|---|---|---|---|---|
| 6.35 | 1-ethyl-1-methyl-cyclopentane | 1.48 | 998 | GCMS, RI |
| 6.90 | α-pinene | 2.18 | 1031 | GCMS, RI |
| 7.37 | mesitylene | 1.41 | 1059 | GCMS, RI |
| 7.4 | decane | 1.42 | 1061 | GCMS, RI |
| 8.02 | d-limonene | 6.27 | 1097 | GCMS, RI |
| 8.53 | 2-ethyl-1,4-dimethyl-benzene | 1.34 | 1130 | GCMS, RI |
| 9.19 | undecane | 6.64 | 1172 | GCMS, RI |
| 9.56 | prehnitene | 1.90 | 1196 | GCMS, RI |
| 10.00 | 1,2,4,5-tetramethyl-benzene | 2.47 | 1234 | GCMS, RI |
| 10.50 | dodecane | 1.48 | 1280 | GCMS, RI |
| 11.46 | 2-undecanone | 43.06 | 1384 | GCMS, RI |
| 11.55 | 1-octadecene | 1.73 | 1394 | GCMS, RI |
| 13.07 | 2-tridecanone | 15.21 | 1610 | GCMS, RI |
| 13.76 | caryophyllene | 0.27 | 1711 | GCMS, RI |

TABLE 1C-continued

Composition of Z. martinicense Essential Oils Obtained by Gas Chromatography

| $T_R$/min | Compound[a] | % Area | RI[b] | ID[c] |
|---|---|---|---|---|
| 13.92 | caryophyllene oxide | 1.45 | 1732 | GCMS, RI |
| 16.85 | 4-methoxycinnamate | 0.74 | 2082 | GCMS, RI |
| | Total | 91.33 | | |

[a]Elution order on HP capillary column.
[b]Retention index relative to n-alkane series ($C_5$-$C_{30}$ excluding $C_{27}$ and $C_{29}$) on HP DB-5 column,
[c]GCMS identification by Gas-chromatography-Mass spectroscopy In another example, the non-host plant is from the genus *Piper*. The *Piper* spp. are a rich source of plants that contain toxins that cause death or deformity in target insects. For example, the toxins derived from *Piper* spp. can, for example, apiol, piperine and other piperamides, pellitorine, pipercide, phenylpropanoid, dillapiol, safrole, piperonyl butoxide, or their analogs. The formulae for several of toxins derived from *Piper* spp. are shown below. Until now, no one has identified apiol as the active ingredient responsible for the pesticidal qualities of *Piper aduncum*, and no one has used plants such as *Piper* spp. as a method of controlling the feeding and breeding behavior of butterflies. Compounds derived from *Piper* spp. can be used as control measures against, for example, *P. demoleus*, by treating plants of interest with extracts containing these compounds, or by applying directly to the butterflies extracts that contain these compounds.

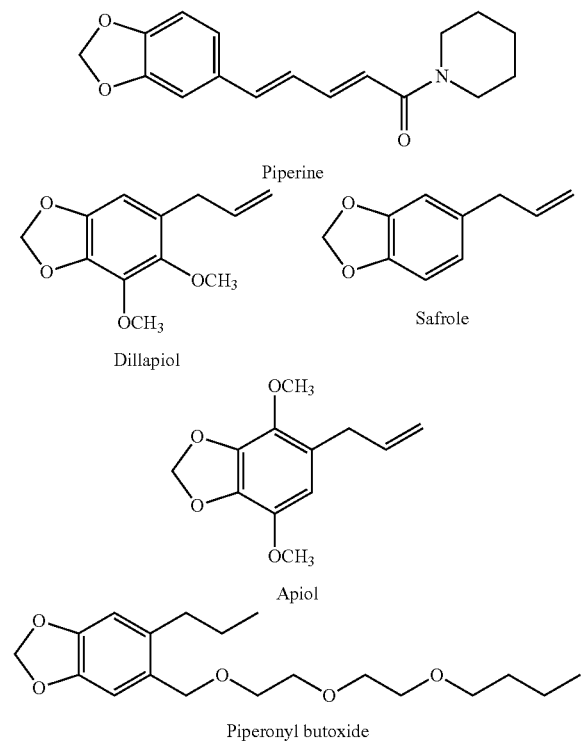

Piperine

Dillapiol

Safrole

Apiol

Piperonyl butoxide

In another embodiment in which chemical attractant is applied to non-host plants, for *P. demoleus*, the non-host plant can be *Piper amalago* var. *amalago* plant, because *P. demoleus* has not been observed to feed on *Piper amalago* var. *amalago* plant in the wild. *Piper amalago* var. *amalago* plant, however, contains a low level (ca. 4 wt %) of the same chemical attractant for *P. demoleus* called d-limonene (see, Table 1D) that is found in the lime plant. If additional attractant, e.g., d-limonene concentrate or an extract of essential oils from the lime plant, is applied to non-host plant, the attractant will induce gravid females to lay eggs on the non-host plants that cannot sustain their offspring. The emerging juveniles detect a repellant in the non-host plant and refuse to feed on it. They eventually die of starvation. If the chemical attractant limonene were removed from *Piper amalago* var. *amalago* plant oil, gravid females would likely find it repellant and would not lay eggs on it at all. This would likely hold true even if they had been predisposed to prefer to lay eggs on plants with *Piper amalago* var. *amalago* plant oil. Referring to Table 1E, *Piper aduncum*, on the other hand, contains no limonene or d-limonene. Rather it contains a large amount of the pesticide apiol. However, *P. demoleus* can be induced to lay eggs on *Piper aduncum* by applying chemical attractant derived from, e.g., a plant of interest. Once the eggs hatch, the larvae refuse to feed on *Piper aduncum* and die of starvation.

TABLE 1D

Composition of *Piper amalago* var. *amalago* leaf oils by Gas Chromatography

| $T_R$/min | Compound[a] | % Area | RI[b] | ID[c] |
|---|---|---|---|---|
| 6.03 | α-pinene | 4.67 | 932 | GCMS, RI |
| 6.81 | β-pinene | 6.52 | 1026 | GCMS, RI |
| 7.27 | 3-carene | 9.42 | 1053 | GCMS, RI |
| 7.64 | 2,4-thujadiene | 19.99 | 1075 | GCMS, RI |
| 8.02 | d-limonene | 4.4 | 1097 | S/M, RI |
| 8.62 | (R,S) linalool | 5.93 | 1135 | GCMS, RI |
| 9.71 | camphor | 0.29 | 1208 | GCMS, RI |
| 10.19 | germacrene B | 2.64 | 1251 | GCMS, RI |
| 10.25 | α-terpineol | 1.75 | 1257 | GCMS, RI |
| 10.36 | crypton | 1.44 | 1267 | GCMS, RI |
| 11.18 | cuminaldehyde | 0.32 | 1352 | GCMS, RI |
| 11.66 | 4-(1-methylethyl)benzene-methanol | 0.36 | 1408 | GCMS, RI |
| 12.3 | piperitone | 0.48 | 1494 | GCMS, RI |
| 13.07 | α-cubene | 1.66 | 1610 | GCMS, RI |
| 13.19 | 1H-cyclopenta[1,3]cyclopropa[1,2]benzene | 0.78 | 1628 | GCMS, RI |
| 13.76 | caryophyllene | 0.87 | 1712 | GCMS, RI |
| 14.35 | γ-murolene | 1.04 | 1788 | GCMS, RI |
| 14.45 | α-gurjunene | 1.64 | 1801 | GCMS, RI |
| 14.5 | β-guaiene | 0.74 | 1807 | GCMS, RI |
| 14.64 | β-cadinene | 0.56 | 1824 | GCMS, RI |
| 14.71 | β-gurjunene | 2.94 | 1832 | GCMS, RI |
| 14.89 | α-cadinene | 1.84 | 1853 | GCMS, RI |
| 14.98 | calamenene | 4.01 | 1864 | GCMS, RI |
| 15.21 | nerolidol | 1.16 | 1891 | GCMS, RI |
| 15.79 | spathulenol | 1.23 | 1960 | GCMS, RI |
| 16.03 | caryophyllene oxide | 1.17 | 1988 | GCMS, RI |
| 16.33 | calarene | 1.64 | 2022 | GCMS, RI |
| 16.44 | α-guaiene | 0.78 | 2035 | GCMS, RI |
| 16.5 | copaene | 2.15 | 2042 | GCMS, RI |
| 16.66 | δ-selinene | 1.33 | 2060 | GCMS, RI |
| | Total | 83.75 | | |

[a]Elution order on HP capillary column.
[b]Retention index relative to n-alkane series ($C_5$-$C_{30}$ excluding $C_{27}$ and $C_{29}$) on HP DB-5 column,
[c]GCMS identification by Gas-chromatography-Mass spectroscopy,
*matched by authentic internal standard

TABLE 1E

Composition of *Piper aduncum* leaf oils by Gas Chromatography

| | Compound[a] | Retention time | RI | Area |
|---|---|---|---|---|
| 1 | α-pinene | 6.71 | 953 | 0.31 |
| 2 | β-pinene | 7.5 | 979 | 0.34 |
| 3 | β-myrcene | 7.66 | 988 | 0.14 |
| 4 | m-cymene | 8.3 | 1026 | 0.87 |
| 5 | trans-β-ocimene | 8.46 | 1035 | 1.98 |
| 6 | cis-β-ocimene | 8.64 | 1046 | 2.97 |
| 7 | 3-carene | 8.87 | 1060 | 0.54 |
| 8 | α-terpinolene | 9.32 | 1087 | 0.22 |
| 9 | terpinen-4-ol | 10.92 | 1182 | 1.61 |
| 10 | d-piperitone | 12.27 | 1260 | 3.96 |
| 11 | copaene | 14.27 | 1382 | 0.42 |
| 12 | germacrene A | 14.45 | 1394 | 0.26 |
| 13 | caryophyllene | 14.97 | 1430 | 1.68 |
| 14 | α-caryophyllene | 15.48 | 1466 | 0.65 |
| 15 | β-cubene | 15.83 | 1490 | 1.30 |
| 16 | myristicin | 16.31 | 1526 | 3.53 |
| 17 | elemicin, (Z) | 16.59 | 1547 | 0.41 |
| 18 | nerolidol | 16.77 | 1561 | 0.28 |
| 19 | γ-elemene | 16.9 | 1572 | 0.23 |
| 20 | (—)-spathulenol | 17.11 | 1588 | 0.23 |
| 21 | caryophyllene oxide | 17.2 | 1595 | 0.86 |
| 22 | γ-selinene | 17.35 | 1607 | 0.79 |
| 23 | apiol | 17.65 | 1632 | 71.06 |
| 24 | 4,5-dihydro-1,3-diphenyl-1H-pyrazole, | 17.77 | 1642 | 0.37 |
| 25 | calarene | 17.92 | 1655 | 0.55 |
| | | | Total | 95.56 |

Figure 3:
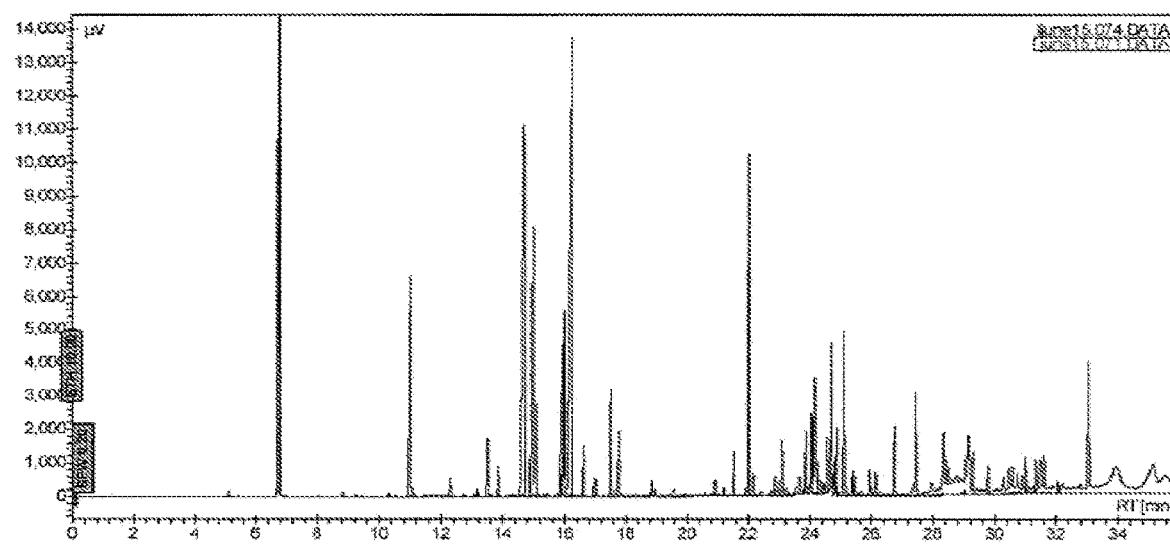
FIG. 3 is an image of superimposed gas chromatographs of lime plant and *Piper amalago* var. *amalago* plant leaf essential oils.

[a]Elution order on HP capillary column.
[b]Retention index relative to n-alkane series ($C_5$-$C_{30}$ excluding $C_{27}$ and $C_{29}$) on HP DB-5 column.
[c]GCMS identification by Gas-chromatography-Mass spectroscopy In any of the embodiments described above, a plant that is suitable as a non-host plant may, but not in all cases, have at least one chemical in common with the plant of interest. This can be determined by comparing the compositions of the non-host plant and plant of interest by, e.g., gas chromatography. For example, *Piper amalago* var. *amalago* plants and lime plants both contain d-limonene (see Tables 1A and 1D). The chromatographs for *Piper amalago* var. *amalago* plant and lime plant superimposed, shown in FIG. 3, reveal that one common oil, d-limonene, is at least one of the attractants for gravid females found in both *Piper amalago* var. *amalago* plant and lime plants. Referring again to FIG. 3, Tables 1A, 1D and 1E, *Piper amalago* var. *amalago*, lime and *Piper aduncum* plants each contain several compounds not shared by the other. These chemical differences are responsible for the differences observed in the ability of these plants to sustain or kill and deform target insects.

Isolation and Characterization of Oils from the Non-Host Plant and Plant of Interest The chemical attractant and extract can be one of several chemicals. For example, the chemical attractant can be derived from plants of interest, and extract can be derived from non-host plants. The chemical attractant or non-host plant extract can be extracts of soluble components from the plant of interest or non-host plant, respectively. For example, the chemical attractant or non-host plant extract can contain components soluble in hydrophobic medium as an oil extract or in hydrophilic and aqueous media as a water extract. Chemical attractant and non-host plant extract can be obtained using techniques known in the art, such as hydrodistillation, hydro diffusion, cold pressing, extraction using a hydrocarbon solvent, super critical fluid extraction using carbon dioxide and other super critical fluids, steam distillation, fractional distillation, enfleurage extraction, maceration extraction, including those processes with zeolite removal of the water after maceration, and spinning cone extraction.

Isolation and purification of individual or groups of chemical compounds can be accomplished using methods established in the art, such as gas, liquid, including such developments as high performance liquid chromatography (HPLC), high performance liquid chromatography guided by mass spectroscopy (HPLC-MS), high performance liquid chromatography guided by nuclear magnetic resonance spectroscopy (HPLC-NMR), multiple high performance liquid chromatography (HPLC-HPLC), ultra-performance liquid chromatography (UPLC), and ultra-performance liquid chromatography coupled to-time-of flight mass spectrometry (UPLC-TOF-MS), countercurrent or centrifugal partition chromatography (CCC or CPC), column and size-exclusion chromatography, homogenization, distillation, and fractional distillation.

Figure 2:
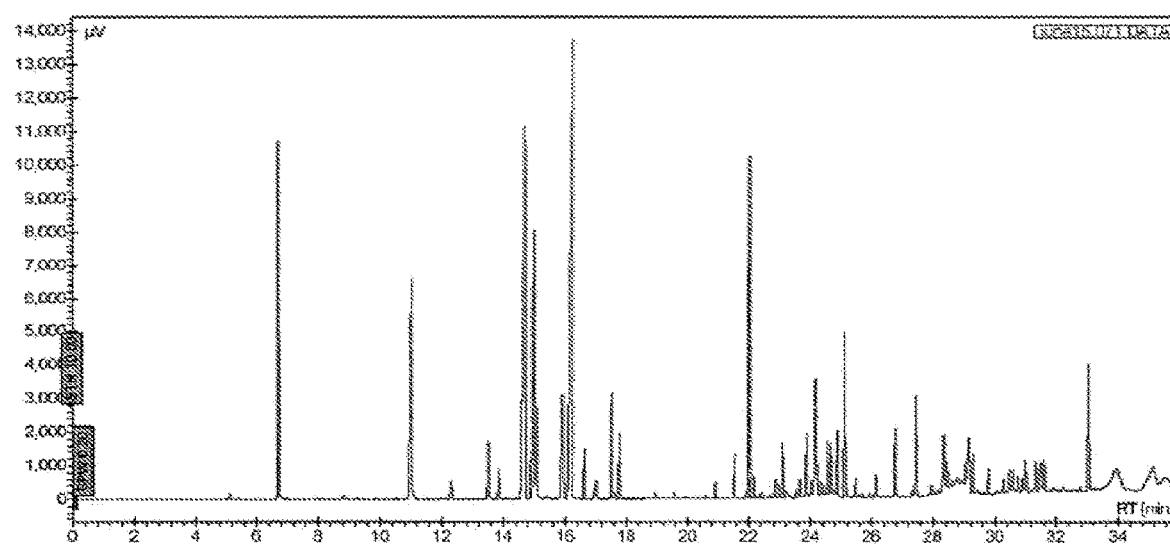
FIG. 2 is an image of a gas chromatograph of *Piper amalago* var. *amalago* plant leaf essential oils.

*Piper amalago* var. *amalago* plant oil is characterized by a pale yellow to colorless oil whose odor has a strong similarity to *Piper nigrinodum* (black pepper). FIG. 2 shows an image of a gas chromatograph for *Piper amalago* var. *amalago* plant oil. Referring to Table 1D, the major components of the oil derived from *Piper amalago* var. *amalago* plant, and their relative amounts, consist of bicyclo[3.1.0] hex-2-ene (19.99%), 3-carene (9.42%), beta pinene (6.52%), 1,6-octadien-3-ol (5.93%), d-limonene (5.14%), alpha pinene (4.67%), 1,2,3,4-tetrahydro-1,6-dimethyl-4-(1-methylethyl) (4.01%), 1H-cyclopropa[a]naphthalene (2.94%), and alpha cubene (2.15%).

Table 1A lists the composition of lime plant oil, and FIG. 1 shows an image of a gas chromatograph for lime plant oil. The major components of oil derived from lime plants, and their relative amounts, are d-limonene (22.04%), 2,6,10,14, 18,22-Tetracosahexanene (14.05%), 2,6-octadienal (E) (12.91%), 2-pentanone, 4 hydroxy-4-methyl (10.13%), 2,6-octadienal (Z) (9.13%), and squalene (4.48%).

Hydrodistilling 952.7 g of lime plant yielded 1.44 g of oil, 0.151% by weight; 378.6 g of *Piper* plant yielded 0.446 g of oil, 0.085% by weight; 193.2 g *Citrus sinensis* leaves yielded 0.782 g of oil, 0.405% by weight; 794 g of *Piper amalago*, var. *nigrinodum* leaves yielded 0.719 g of oil, 0.091% by weight; 207.9 g of *Zanthoxylum martinicense* leaves yielded 0.0365 g of oil, 0.0176% by weight; and 297.35 g of *Piper aduncum* leaves yielded 0.8919 g of a clear oil with a minty-like odor was obtained, a yield of 0.30% by weight.

Oil Applications and Concentrations

The chemical attractant is applied in an amount sufficient to induce target insects to breed on the non-host plant, and chemicals in the non-host plant repel the feeding of juvenile target insects, whereas the non-host plant extract is applied in an amount sufficient to kill or deform target insects that consume the extract. The amount of chemical attractant or non-host plant extract used varies depending on the manner in which it is applied and the type of non-host plant or plant of interest to which it is applied. The amounts also vary depending on the species of target insect and ambient conditions.

The amount of chemical attractant required to attract target insects depends on several factors, such as the type of insect targeted, ambient conditions, and the plant source. The amount of lime plant oil in the aerosol mixture applied to the non-host plant sufficient to induce a number of target insects to breed on sprayed the non-host plant instead of the plant of interest generally is two to three times the natural concentration of essential oils in lime plant leaves. However, the amount can be four, five, or six times the natural concentration of essential oils in plants' of interest leaves. Specifically, the amount of essential oils required to attract target insects can range from about is about 0.01%-0.50% by weight. In a preferred embodiment, the amount is 0.45% by weight, or three times the natural concentration of the oil in plants of interest. More particularly, it can be 0.01%-0.05%; 0.05%-0.10%, 0.10%-0.15%, 0.15%-0.20%; 0.20%-0.25%; 0.25%-0.30%; 0.30%-0.35%; or 0.35%-0.40%; 0.40%-0.45%; or 0.45%-0.50% by weight.

The amount of non-host plant extract required to kill or deform target insects that ingest it depends on several factors, such as the type of insect targeted, ambient conditions, and the plant source. Using *Piper amalago* var. *amalago* plant essential oils in an alkane hydrocarbon aerosol mixture as an example, generally, the amount of essential oil derived from the non-host plant in the aerosol mixture required to both attract the egg laying of gravid females and cause death or deformity in juveniles that feed on it is two to three times the natural concentration of essential oils in the non-host plant leaves. However, the amount can be four, five, or six times the natural concentration of essential oils in the non-host plant leaves. Specifically, the amount of non-host plant essential oils required to attract target insects can range from about is about 0.01%-0.50% by weight. More specifically, it can be 0.01%-0.05%; 0.05%-0.10%, 0.10%-0.15%, 0.15%-0.20%; 0.20%-0.25%; 0.25%-0.30%; 0.30%-0.35%; or 0.35%-0.40%; 0.40%-0.45%; or 0.45%-0.50% by weight. In a preferred embodiment, the amount is 0.15% by weight, or three times the natural concentration of the essential oils in the non-host plant leaves. In another embodiment, the amount is about two times the natural concentration of oil in of the non-host plant leaves. In still another embodiment, the amount is four, five, or six times the natural concentration of oil the non-host plant leaves.

The chemical attractant and non-host plant extract exhaust naturally. Once applied, they last for about 12 to 24 hours or more, depending on the chemical stability and volatility of the chemical and ambient conditions. Depending on the species to which the chemicals are directed, the chemical attractant and non-host plant extract attract butterflies from about one or two kilometers away to 10 kilometers or more away.

The strength of the chemical attractant and non-host plant extract dissipate naturally over time, so each should be present in optimal amounts during certain periods. In the method in which the chemical attractant is applied to the non-host plant, one period is the time during which gravid females seek adequate food sources for their young. The chemical attractant should be applied to the non-host plant before gravid females begin to lay their eggs. This helps ensure that at least some gravid females lay eggs on the non-host plant and that the larvae hatch on the non-host plant that is incapable of sustaining them. When non-host plant extract is applied to the plant of interest, the period immediately before the eggs hatch and while larvae feed on the plant of interest is a time during which treating the plant of interest with non-host plant oil is effective. This helps ensure that once hatched, the larvae will ingest poisonous extracts that cause deformity or death.

Other periods during which the chemical attractant and non-host plant extract should be applied include the period before a rainfall. The chemical attractant or non-host plant extract can be applied after a rainfall. The chemical attractant can be applied when new leaves grow on the non-host plant, and the non-host plant extract can be applied to plants of interest when new leaves appear on plants of interest.

The chemical attractant or non-host plant extract can be applied one, two, three, four, five, or more times per day. They can be applied twice daily. In another embodiment, the chemical attractant and non-host plant extract are applied once per week. In other embodiments, they are applied once, twice, three or more times per month.

Materials

Species of plant were collected and deposited in the Herbarium in the Department of Life Sciences at the University of West Indies, Mona, Jamaica. For identification purposes, the plants used in these methods were assigned the following accession numbers:

| Plants | Accession Numbers |
|---|---|
| *Citrus aurantifolia* | 35266 |
| *Citrus sinensis* (L.) Osbeck | 35267 |
| *Piper amalago* var. *amalago* | 35268 |
| *Piper amalago* var. *nigrinodum* | 35291 |
| *Zanthoxylum martinicense* | 35289 |
| *Piper aduncum* | 35435 |

EXAMPLES

Example 1

To determine the suitability of *Piper amalago* var. *amalago* as a non-host plant to reduce the population size of *P. demoleus*, the chemical similarities between *Piper amalago* var. *amalago* plant and a known plant of interest, lime, were investigated. The chemical compositions of *Piper amalago* var. *amalago* plant and lime plants were compared using gas chromatography. An oil common to both plants, d-limonene, was identified and an authentic sample for comparison was obtained from Sigma-Aldrich, Inc.

A Varian CP-3800 gas chromatograph interfaced with a Flame ionization detector (FID) was used to analyze the extracted oils. The gas chromatograph was equipped with a WCOT fused silica coated with CP WAX 52CB capillary column (length 60 m×inner diameters 0.25 mm; 0.25 μm film thickness). The carrier gas was Nitrogen, at a flow rate of 1 mL minute$^{-1}$, split 1:100. The injector temperature was 250° C. The column oven temperature of 40° C. was held for 1 minute, then increased from 40° C. to 100° C., at a rate of 10° C. minute$^{-1}$ held for 1 minute, then increased from 100° C. to 200° C. at a rate of 20° C. minute$^{-1}$, held for 1 minute, and finally increased from 200° C. to 250° C. at a rate of 10° C. minute$^{-1}$ and held for 25 minutes. The FID temperature was maintained at 300° C.

The retention indices (RI) were calculated using a mixture of homologous series of n-alkanes $C_8$-$C_{25}$ analyzed under the same conditions as each oil sample (GC-FID analysis). Retention Index (RI) values were calculated using Kovats' procedure for temperature programming GC equations. (IUPAC, Compendium of Chemical Terminology, Kovats (Retention) Index; 1997).

The chemical compositions of the oils were also determined with GC-MS using a Hewlett Packard (HP) 6890 system Gas Chromatograph interfaced with a HP-5973 Mass Spectrometer. The gas chromatograph was equipped with a DB-VRX fused silica column (length 20 m×internal diameters 0.18 mm, film thickness of 1 μm). Analytical conditions employed were Helium for a carrier gas at a flow rate of 1 mL minute$^{-1}$, split less mode, with an injector temperature of 250° C., interface temperature of 280° C. The temperature program was the same used for the GC-FID analyses previously described. The mass spectra data were collected with ionization energy of 70 eV and a mass range of 50-500 M/Z. An n-alkane mixture was also analyzed under the same temperature program and other conditions, and the RI values calculated for each compound.

The components of the oils were matched with mass spectral data of the NIST 98 library. Peaks that had a peak quality match greater than 70% were considered matches with the compound from the library. Peaks of substantial quantity but poor quality were identified either by matching GC analyses with authentic compounds run in several programs, or by a comparison of the RI value against the published data in Adams. (Adams, Robert, Identification of oil components by gas chromatography/quadruple mass spectrometry; 2001: 9-40).

The presence of d-limonene in *Piper amalago* var. *amalago* plant leaf oil was confirmed by matching it against authentic d-limonene in several temperature programs using the standard program mentioned previously, and two additional temperature programs. The oil was heated initially to 40° C. and held at this temperature for 3 minutes, then heated from 40° C. to 80° C. at a rate of 5° C. minute$^{-1}$ and held at this temperature for 1 minute, then heated from 80° C. to 200° C. at a rate of 10° C. minute$^{-1}$ and held for 2 minutes, then finally heated from 200° C. to 250° C. at a rate of 10° C. minute$^{-1}$ and held at 250° C. for 10 minutes. Then the oil was heated to 40° C. and held for 3 minutes, from 40° C. to 120° C. at a rate of 10° C. minute$^{-1}$ and held for 3 minutes, from 120° C. to 180° C. at a rate of 20° C. minute$^{-1}$ and held for 5 minutes. The oil was finally heated from 180° C. to 250° C. at a rate of 20° C. minute$^{-1}$ and held for 1 minute.

Fresh leaves were collected to extract the oils for analysis by gas chromatography. The leaves were weighed and hydrodistilled for up to four hours, using a Clevenger type apparatus. The extractions were done in triplicate and the essential oils were collected during distillation at hourly intervals. The oils obtained were then dried over anhydrous sodium sulfate and yielded clean, clear oils. The oils were then weighed and stored at 5° C. in a refrigerator for further analysis.

The aerosol mixture for application to citrus plant and *Piper amalago* var. *amalago* plant materials was prepared by combining lime plant oil, *Piper amalago* var. *amalago* plant oil, d-limonene, or a combination thereof, with an alkane hydrocarbon mixture consisting of 28% butane and 72% propane. The aerosol was filled to a concentration of, e.g., 0.25% by weight of *Piper amalago* var. *amalago* plant oil, or 0.45% by weight of lime plant oil.

Example 2

*P. demoleus* were induced to lay eggs on *Piper amalago* var. *amalago* plant to confirm its unsuitability to sustain target insects and to determine whether it could be used to reduce the population size of target insects. Natural *Piper amalago* var. *amalago* plant was considered a suitable non-host plant because *P. demoleus* would not feed or breed on it in the wild. However, when *Piper amalago* var. *amalago* plant was sprayed with d-limonene or lime oil, the majority of the *P. demoleus* population was induced to breed, but not feed, on *Piper amalago* var. *amalago* plants.

Twelve pupae bred on lime plants were placed in the laying cage and were allowed to mate. Gravid females were given a choice of plants on which to lay: unsprayed lime, unsprayed *Piper amalago* var. *amalago* plant, and *Piper amalago* var. *amalago* plant sprayed with lime plant oil. *Piper amalago* var. *amalago* plant sprayed with lime plant oil was prepared using an aerosol spray containing 0.45% by weight lime plant oil in a hydrocarbon mixture. The aerosol mixture was applied to the young leaves of *Piper amalago* var. *amalago* plants twice daily.

TABLE 1

Induced Laying of *P. demoleus* on *Piper amalago* var. *amalago* Plant

| Unsprayed Lime Plant | Unsprayed *Piper amalago* var. *amalago* Plant | *Piper amalago* var. *amalago* Plant Sprayed with Lime Oil |
|---|---|---|
| 34 eggs (36%) | 0 eggs | 61 eggs (64%) |
| | Total no. of eggs laid: 95 | |

Gravid females were allowed to lay eggs until the laying subsided on the tenth day. The laying pattern was recorded and is summarized in Table 1. Of the 95 eggs laid, the majority were laid on *Piper amalago* var. *amalago* plant sprayed with lime oil. Sixty-one eggs, or 64%, were laid on *Piper amalago* var. *amalago* plant sprayed with lime oil. Only 34 eggs, or 36%, were laid on unsprayed lime plant. No eggs were laid on unsprayed *Piper amalago* var. *amalago* plant. Thus, the use of lime plant oil, applied to a non-host plant such as *Piper amalago* var. *amalago* plant, was effective in controlling the breeding behavior of *P. demoleus* by causing gravid females to lay the majority of their eggs on *Piper amalago* var. *amalago* plant sprayed with lime plant oil instead of on lime plants.

Example 3

Ingestion of *Piper amalago* var. *amalago* plant oil by *P. demoleus* had a devastating effect on the butterflies, and therefore, inducing the butterflies to consume *Piper amalago* var. *amalago* plant oil proved an effective control measure. An aerosol spray containing 0.25% by weight of *Piper amalago* var. *amalago* plant oil was applied to the young lime plant leaves once daily, and the larvae were allowed to feed on the sprayed leaves.

Generally, the time from pupation to emergence for adult *P. demoleus* is approximately 10 to 12 days. However, the average time from pupation to emergence for adult *P. demoleus* that fed on *Piper amalago* var. *amalago* plant-oil sprayed lime plant leaves was significantly longer, taking an average of about three weeks.

TABLE 2

Results *P. demoleus* That Have Ingested Lime Plant Sprayed with *Piper amalago* var. *amalago* Plant Oil

| Total No. of Pupae | No. of Pupae Died in Pupal Shell | No. of Pupae Developed into Deformed Adults | No. of Pupae Hatched into Normal Adults |
|---|---|---|---|
| 15 | 4 | 8 | 3 |
| 100% | 26.7% | 53.3% | 20.0% |

TABLE 3

Results *P. demoleus* That Have Ingested Lime Plant Sprayed with *Piper amalago* var. *amalago* Plant Oil

| Total no. of pupae | No. of pupae that died in pupal shell | No. of pupae resulting in deformed adults | No. of pupae apparently hatching into normal adults |
|---|---|---|---|
| 24 | 6 | 11 | 3 |
| 100% | 25.0% | 45.8% | 29.2% |

Figure 4:
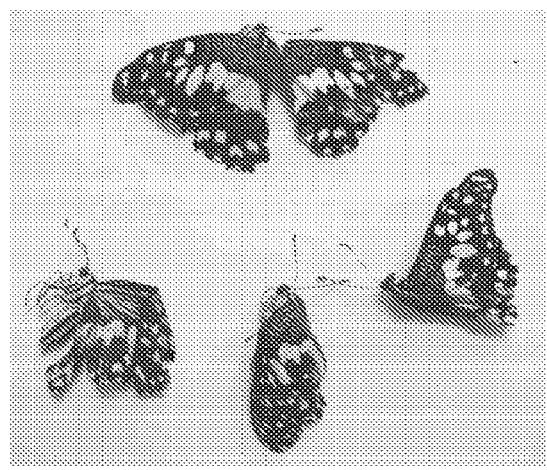
FIG. 4 is an image of adult *P. demoleus* with deformities caused by ingesting lime plant sprayed with *Piper amalago* var. *amalago* plant oil.
Figure 5:
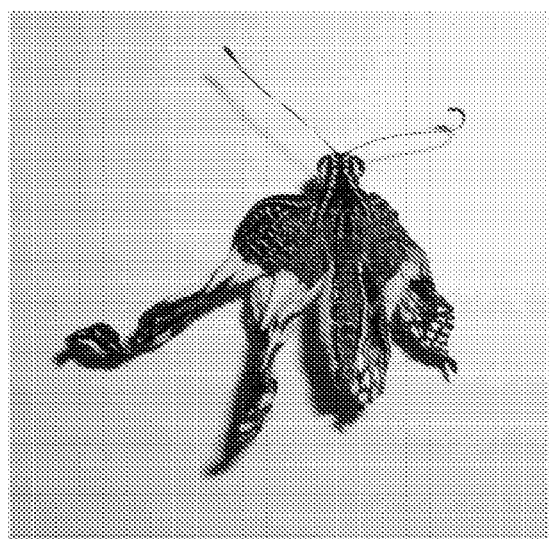
FIG. 5 is an image of adult *P. demoleus* with deformities caused by contact at the larval stage with an emulsion containing *Piper aduncum*.

Tables 2 and 3 show the results of two experiments where *P. demoleus* ingested lime plant sprayed with *Piper amalago* var. *amalago* plant oil. As many as 80% of the *P. demoleus* that fed on lime plant sprayed with *Piper amalago* var. *amalago* died or grew into deformed adults after pupation. Most of the affected larvae had difficulty pupating. Many could not suspend themselves from surfaces such as twigs. Some that became pupae had shells that became soft. Those pupae died in their shells. The remaining affected larvae hatched as adults that were deformed, unable to fly or had difficulty reproducing. The various deformities are shown in FIG. 4.

Example 4

The *P. demoleus* that survived and were still able to reproduce after ingesting *Piper amalago* var. *amalago* plant oil displayed unusual laying patterns not observed in *P. demoleus* that had not ingested *Piper amalago* var. *amalago* plant oil. However, their tendency to prefer to lay eggs on *Piper amalago* var. *amalago* plant or on lime plant sprayed with *Piper amalago* var. *amalago* plant oil persisted. In this experiment, the leaves that were sprayed with lime or *Piper amalago* var. *amalago* plant oils were sprayed twice daily.

TABLE 4

Egg-Laying Patterns of *P. demoleus* That Have Ingested Lime Plant Sprayed with *Piper amalago* var. *amalago* Plant Oil

| Location Where Eggs Laid | No. of Eggs Laid | % |
|---|---|---|
| Lime, unsprayed | 10 | 15.38 |
| *Piper amalago* var. *amalago*, unsprayed | 16 | 24.62 |
| Lime, sprayed with *Piper amalago* var. *amalago* plant oils | 13 | 20.00 |
| Plant Containers | 26 | 40.00 |
| Total | 65 | 100.00 |

Four of the *P. demoleus* described in Example 3 as having fed on *Piper amalago* var. *amalago* plant oil but surviving without suffering any apparent deformities, were allowed to mate. Instead of laying eggs as early as one day after mating as is normal in this species, egg laying did not occur for eight to ten days following mating. When the eggs were laid, as Table 4 reflects, only 15.38% of the eggs were laid on unsprayed lime plant. The rest of the eggs were laid on unsprayed *Piper amalago* var. *amalago*, lime plant sprayed with *Piper amalago* var. *amalago* plant oil, or on the plant containers. The eggs laid on the plant containers instead of on the young lime plant and *Piper amalago* var. *amalago* plant leaves would hatch and, without a food source, die. The majority of those laid on lime plants sprayed with *Piper amalago* var. *amalago* plant oil either would die or would be expected to become deformed if *Piper amalago* var. *amalago* oil was maintained in their diet, based on the experiments described in Tables 2 and 3. The juveniles hatching from eggs laid on *Piper amalago* var. *amalago* plants would die of starvation. In total, approximately 85% of the eggs laid were laid on a food source that would lead to either death or deformity in most if not all of the juveniles.

Thus, the use of *Piper amalago* var. *amalago* plant oil sprayed on lime plants effectively controlled the feeding and breeding of the majority of *P. demoleus* by deforming or killing *P. demoleus* that fed on lime leaves sprayed with *Piper amalago* var. *amalago* plant oil, and by killing those laid on *Piper amalago* var. *amalago* sprayed with lime plant oil.

Example 5

The suitability of *Piper aduncum* as a non-host plant was investigated by allowing adult *P. demoleus* to mate and lay eggs. *Piper aduncum* shoots were collected in Andrew, Jamaica, and 297.35 g of leaves were placed in a Clevenger-type extractor and extracted with boiling water. Once extracted according to the methods described in Example 2, 0.8919 g of clear oil with a minty-like odor was obtained, a yield of 0.30% by weight.

Five *P. demoleus* pupae were placed in the cage. Upon hatching, the emerging adults were determined to be 3 males and 2 females. The butterflies were allowed to mate and given a choice of plants on which to lay by placing all around the cage unsprayed lime seedlings, unsprayed *Piper aduncum* cuttings, *Piper aduncum* cuttings sprayed with lime oil, and *Piper aduncum* cuttings sprayed with d-limonene. Egg laying was allowed to continue for up a total of 16 days, only the first 8 of which the *Piper aduncum* shoots remained fresh. Referring to Table 5A, a total of 16 eggs were laid in the first 8 days. The majority of eggs (62.5%) were laid on unsprayed lime plant. However, a significant number of eggs were laid on sprayed *Piper aduncum* shoots (37.5%). Interestingly, *Piper aduncum* sprayed with lime plant oil was just as attractive to the butterflies as *Piper aduncum* sprayed with d-limonene, further supporting our conclusion that d-limonene is the, or at least one of, the attractants responsible for attracting *P. demoleus* and other butterfly species to citrus plants. No eggs were laid on unsprayed *Piper aduncum*.

After day 8, the *Piper aduncum* leaves began to wilt and were noticeably less attractive to gravid females. Table 5B shows that after day 8, no additional eggs were laid on *Piper aduncum*; however, an additional 23 eggs were laid on unsprayed lime plant. By day 20, no more eggs were laid, and the total number of eggs was counted.

TABLE 5A

Egg laying by *P. demoleus* on *Piper aduncum* on Days 1-8

| Unsprayed lime plant | Unsprayed *Piper aduncum* | *Piper aduncum* sprayed with lime plant oil | *Piper aduncum* sprayed with d-limonene |
|---|---|---|---|
| 10 | 0 | 3 | 3 |
| Total: 16 eggs | | | |

TABLE 5B

| Egg laying by P. demoleus for Days 9-20 | | | |
|---|---|---|---|
| Unsprayed lime plant | Unsprayed *Piper aduncum* | *Piper aduncum* sprayed with lime plant oil | *Piper aduncum* sprayed with d-limonene |
| 33 | 0 | 3 | 3 |
| | Total: 39 eggs | | |

All of the eggs that were laid on lime plant hatched into larvae that fed normally on the lime plant leaves on which they were laid. The 6 eggs laid on *Piper aduncum* shoots sprayed with lime oil or d-limonene hatched normally. The *Piper aduncum* shoots were still young, fresh, and otherwise capable of sustaining larvae when the eggs laid eggs on sprayed *Piper aduncum* shoots hatched. However, none of the emerging larvae fed on the *Piper aduncum* shoots, and all 6 larvae eventually died.

Example 6

To determine the toxicity of *Piper aduncum* leaf essential oil, twenty-two second instar *P. demoleus* larvae were sprayed with 2 mL of a 2% *Piper aduncum* leaf oil dissolved in ethanol. The mixture was applied to the larvae with a Potter's tower.

After the first day of spraying, 17 larvae (77%) died. On the second day of spraying, another 4 larvae (18%) died, leaving one survivor. The remaining larva was subjected a daily spray of the *Piper aduncum* solution until it pupated after day 15. After another 10 days, it emerged from its pupal shell as a severely deformed adult.

For the control experiment, 14 second instar *P. demoleus* larvae were sprayed daily with 2 mL of ethanol with a Potter's tower. After the fourth day of spraying, one larva died, apparently of natural causes, leaving 13 survivors. Spraying continued for a total of 17 days, at which time the remaining 13 larvae pupated. All 13 pupae hatched into adults that appeared normal and which later mated and laid eggs that hatched into normal larvae.

It is to be understood that while the invention has been described in conjunction with the detailed description thereof, the foregoing description is intended to illustrate and not limit the scope of the inventions, which are defined by the scope of the appended claims. Other aspects, advantages, and modifications are within the scope of the following claims.

What is claimed is:

1. A method of controlling a target insect population comprising:
    providing a non-host plant containing a toxin and applying to the non-host plant additional chemical attractant to induce the target insect to lay eggs on the non-host plant, wherein the target insect laid on the non-host plant dies of starvation after it emerges from the egg.
2. The method of claim 1, wherein the target insect is a citrus-feeding insect.
3. The method of claim 2, wherein the target insect is a citrus-feeding butterfly.
4. The method of claim 1, wherein the target insect belongs to the species *Papilio demoleus*.
5. The method of claim 1, wherein the target insect is *Papilio demoleus: demoleus* L.; *Papilio demoleus: libanius* Fruhstorfer; *Papilio demoleus: malayanus* Wallace; *Papilio demoleus: novoguineensis* Rothschild; *Papilio demoleus: sthenelus* Macleay; or *Papilio demoleus: stenelius* Rothschild.
6. The method of claim 1, wherein the non-host plant is incapable of sustaining the target insect.
7. The method of claim 6, wherein the non-host plant is a *Piper* plant.
8. The method of claim 6, wherein the non-host plant is a plant on which the target insect does not naturally feed in the wild.
9. The method of claim 6, wherein the non-host plant is one or more plants selected from the group consisting of *Piper amalago* var. *amalago* L. (Piperaceae), *Piper aduncum, Piper nigrinodum, Cleome rutidosperma* (Capperaceae), *Pentas* spp. (Rubiaceae), *Lantana camara* (Verbenaceae), *Canna indica* ((Cannaceae), *Kalanchoe crassula* (Crassulaceae), *Pimenta dioica* (Myrtaceae), *Peperomia pellucida* (Piperaceae), *Phyllanthus amarus* (Euphorbiaceae), *Pilea microphylla:microphylla* (Urticaceae), *Oxalis corymbosa* (Oxalidaceae), *Begonia* sp. (Begoniaceae), and *Dracaena sandariana* (Liliaceae) (Chinese bamboo).
10. The method of claim 1, wherein the chemical attractant comprises oil derived from a citrus plant.
11. The method of claim 1, wherein the chemical attractant comprises oil derived from a plant on which the target insect does not naturally feed in the wild.
12. The method of claim 1, wherein the chemical attractant comprises limonene or d-limonene.
13. The method of claim 1, wherein the chemical attractant comprises oil derived from one or more plants selected from the group consisting of *Citrus aurantifolia* (Christm.) Swingle (Rutaceae), lime, *C. limon* (L.) Burm. F., lemon, *C. sinensis* (L.) Osbeck, sweet orange, *C. reticulata* Blanco, Mandarin orange, tangerine, *C. paradisi* Macf., grapefruit, *C. medica* L., citron, *C. aurantium* L. Seville orange, *C. grandis* (L.) Osbeck, shaddock, pummelo, *C. maxima* citron, *C. aurantium* L. Seville orange, *C. grandis* (L.) Osbeck, shaddock, pummelo, *C. maxima* (Burm.) Merr, ugli, *C. reticulata* Blanco×*C. sinensis* (L.) Osbeck, ortanique, *C. mitis* Blanco, calamondin, *Fortunella margarita* Lour. Swingle, kumquat (Rutaceae), *Amyris* P. Browne (Rutaceae), *Zanthoxylum* L. *Zanthoxylum martinicense* (Lam.), and *Z. pterota* L. (Rutaceae).
14. The method of claim 1, wherein the chemical attractant is applied to the plant of interest in the form of a spray, paste, gum, oil, solution, aerosol, mist, dust, fume, or gas.
15. The method of claim 14, wherein the aerosol consists of a mixture of limonene, d-limonene, or a mixture thereof, and butane and propane.
16. The method of claim 15, wherein the amount of chemical attractant in the mixture is about 0.01%-0.05%; 0.05%-0.10%, 0.10%-0.15%, 0.15%-0.20%; 0.20%-0.25%; 0.25%-0.30%; 0.30%-0.35%; or 0.35%-0.40%; 0.40%-0.45%; or 0.45%-0.50% by weight.
17. A method of controlling the population size of *Papilio demoleus* comprising:
    providing a *Piper* plant that contains a toxin and applying to the *Piper* plant chemical attractant comprising limonene or d-limonene, wherein application of the chemical attractant induces *Papilio demoleus* to lay eggs on the *Piper* plant, and *Papilio demoleus* laid on the *Piper* plant die of starvation after emerging from the eggs.
18. The method of claim 17, wherein the target insect is *Papilio demoleus: demoleus* L.; *Papilio demoleus: libanius* Fruhstorfer; *Papilio demoleus: malayanus* Wallace; *Papilio*

*demoleus: novoguineensis* Rothschild; *Papilio demoleus: sthenelus* Macleay; or *Papilio demoleus: stenelius* Rothschild.

19. The method of claim 17, wherein the chemical attractant is applied in the form of a spray, paste, gum, oil, solution, aerosol, mist, dust, fume, or gas.

20. The method of claim 19, wherein the aerosol consists of a mixture of chemical attractant, butane, and propane.

21. The method of claim 20, wherein the chemical attractant is derived from a citrus plant.

22. The method of claim 21, wherein the amount of limonene or d-limonene in the mixture is about 0.01%-0.05%; 0.05%-0.10%, 0.10%-0.15%, 0.15%-0.20%; 0.20%-0.25%; 0.25%-0.30%; 0.30%-0.35%; or 0.35%-0.40%; 0.40%-0.45%; or 0.45%-0.50% by weight.

23. A method of controlling the population size of *Papilio demoleus* comprising: applying directly to *Papilio demoleus* a toxic extract derived from a non-host plant.

24. The method of claim 23, wherein the non-host plant is a plant on which *Papilio demoleus* is not observed feeding in the wild.

25. The method of claim 23, wherein the non-host plant is a *Piper* plant.

26. The method of claim 23, wherein the non-host plant is *Piper aduncum*.

27. The method of claim 23, wherein the toxic extract comprises apiol.

28. The method of claim 23, wherein the toxic extract is selected from the group consisting of piperine, pellitorine, pipercide, phenylpropanoid, dillapiol, safrole, piperonyl butoxide, and their analogs.

29. The method of claim 23, where in the extract is applied as a spray that contains toxin selected from the group consisting of apiol, piperine, pellitorine, pipercide, phenylpropanoid, dillapiol, safrole, piperonyl butoxide, and their analogs.

30. The method of claim 29, where in the extract is applied as a spray that contains the toxin apiol.

31. The method of claim 23, wherein the amount of toxin in the extract is 0.1%-0.5%; 0.5%-1.0%, 1.0-1.5%, 1.5%-2.0%, 2.0%-2.5%, 2.5%-3.0%, 3.0%-3.5%, 3.5%-4.0%, 4.0%-4.5%, 4.5%-5.0%, 5.0%-5.5%, 5.5%-6.0%, 6.0%-6.5%, or 6.5%-7.0% by weight.

* * * * *